United States Patent

Hagen

[11] Patent Number: 5,130,707
[45] Date of Patent: Jul. 14, 1992

[54] PREASSEMBLED AIR DATA SENSOR AND TRANSDUCER

[75] Inventor: Floyd W. Hagen, Eden Prairie, Minn.

[73] Assignee: Rosemount Inc., Eden Prairie, Minn.

[21] Appl. No.: 751,646

[22] Filed: Aug. 26, 1991

Related U.S. Application Data

[63] Continuation of Ser. No. 472,344, Jan. 30, 1990, abandoned.

[51] Int. Cl.⁵ .................................... G08B 21/00
[52] U.S. Cl. ................................ 340/945; 73/179; 73/182; 73/180; 244/1 R
[58] Field of Search .............. 340/945, 971, 977, 978; 73/861.65, 861.66-861.68, 179-181, 182, 180, 178 R, 756; 244/1 R

[56] References Cited

U.S. PATENT DOCUMENTS

| | | | |
|---|---|---|---|
| 3,043,142 | 7/1962 | Eiland, Jr. et al. | 73/182 |
| 3,094,868 | 6/1963 | Andersen, Jr. et al. | 73/182 |
| 3,646,811 | 3/1972 | DeLeo et al. | 73/861.65 |
| 4,061,028 | 12/1977 | Nicks | 73/179 |
| 4,350,314 | 9/1982 | Hoadley | 73/180 |
| 4,615,213 | 10/1986 | Hagan | 73/180 |
| 4,617,826 | 10/1986 | Hagen | 73/861.65 |
| 4,645,517 | 2/1987 | Hagen et al. | 73/182 |

Primary Examiner—Jin F. Ng
Assistant Examiner—Brent A. Swarthout
Attorney, Agent, or Firm—Kinney & Lange

[57] ABSTRACT

A preassembled air data sensor probe and air data transducer assembly has permanently connected flexible tubing coupling the air data transducer fittings and the sensor fittings. The flexible tubing permits the air data sensor and air data transducer to be installed into an air vehicle after having been preassembled and pretested for leaks at the factory. The permanently attached assembly avoids the need for calibration or pressure checks after installation on the aircraft. The preassembled flexible tubing permits manipulation of the transducer to mount it into the proper location even in tight quarters. The flexible tubing can have a section that acts as a drain trap for accumulating ingested water.

5 Claims, 2 Drawing Sheets

PREASSEMBLED AIR DATA SENSOR AND TRANSDUCER

This is a continuation of U.S. application Ser. No. 07/472,344 filed Jan. 30, 1990, abandoned as of the date of this application.

BACKGROUND OF THE INVENTION

The present invention relates to an air data sensing assembly which includes a probe or sensor for mounting on the exterior of an air vehicle and an interior air data transducer which utilizes pneumatic signals from ports on the probe and converts the pneumatic signals to electrical signals for use in operating the air vehicle. The sensor and transducer are coupled together with preassembled, permanently attached flexible hoses or lines so that the assembly can be mounted in aircraft even in the very small spaces that are available, without having to disassemble the sensor from the transducer, which makes pressure checks after installation necessary.

Air data sensor assemblies comprising exterior probes and air data transducers which utilize pneumatic signals from the sensors and convert them into usable electrical signals for operating air vehicles have traditionally been pneumatically connected together at the time of installation in the air vehicle in the field using preformed metal tubes. After assembling the formed metal tubes to the two components, it is necessary to conduct a pressure check for each pneumatic circuit to make sure that there are not any leaks from fittings, or from cracks or the like. Signals from the air data transducers are used for "fly by wire" systems on modern air vehicles, and thus any error in signals caused by a pneumatic leak can be disastrous and can cause the air vehicle to malfunction.

Therefore, it has been a standard operating procedure to perform pressure checks of air data sensor assemblies after installation and before the air vehicle is flyable. This has been extremely time consuming, requiring a great deal of extra equipment, and greatly reduces the availability of a very expensive air vehicle.

SUMMARY OF THE INVENTION

The present invention relates to a preassembled, pretested air data sensor and transducer assembly or unit which has flexible tubes carrying individually sensed pressures from the sensor, to the transducer. The flexible tubes are preinstalled and permanently mounted between fittings on the probe or sensor and on the transducer, so that there is no need for pressure checking after the assembly has left the factory. The flexible tubes permit manipulation of the transducer relative to the probe or sensor, and relative to mounting structures of an air vehicle so that the instrument assembly can be installed without disassembly of the two components.

The air data sensing probe or sensor can be of a conventional design that senses static pressure and/or pitot pressure, or can also be a pitot-static-angle of attack sensor that carries three or more pneumatic signals from separate ports. The air data transducer is of a standard design as well, usually made up of absolute and differential pressure sensors that convert pneumatic pressure signals into the desired electrical signals used for aircraft control.

The flexible tubes which join the individual pneumatic signal fittings on the probe to the individual inputs of the air data transducer are permanently attached at both ends, at the factory or ground maintenance depot, and are generally formed as a continuous tube, which can be thus essentially sealed in place, pressure checked in the factory, and once found to be satisfactorily operable, the connections are not disturbed during installation on removal from an aircraft, or during use.

The tubes can be flexible bellows type metal tubes or can be reinforced elastomer tubes that are relatively heavy duty such as hydraulic hoses, but are of small diameter. The hoses or tubes can be connected together in a bundle and held in place with suitable clamps inside the aircraft. The air data transducer has a mounting bracket to hold it in position, but the flexible tubes permit installation by allowing the air data transducer to be twisted or in other ways manipulated relative to the sensor or probe to fit it into place in the tight quarters of an air vehicle.

Because the air data transducer can be mounted to structure separate from the probe, the aircraft structure for mounting the probe can be simplified and reduced in weight as well.

While the flexible hose harness that is used for connecting the air data transducer and the probe will be custom designed for each different type of air vehicle, the flexible hoses permit some adaptability. For example, the air data transducer should always be mounted higher than the probe, and the flexible hoses would permit the left and right hand installations to be from identical assemblies, merely by snaking the hoses in a different manner. The length of the hoses will typically be from two inches to six inches. The hoses can include integrally formed drain trap branches in the flexible hose assembly for permitting collection of moisture at any low points and subsequent draining water that might enter the probe.

DETAILED DESCRIPTION OF THE PREFERRED EMBODIMENTS

Figure 1:
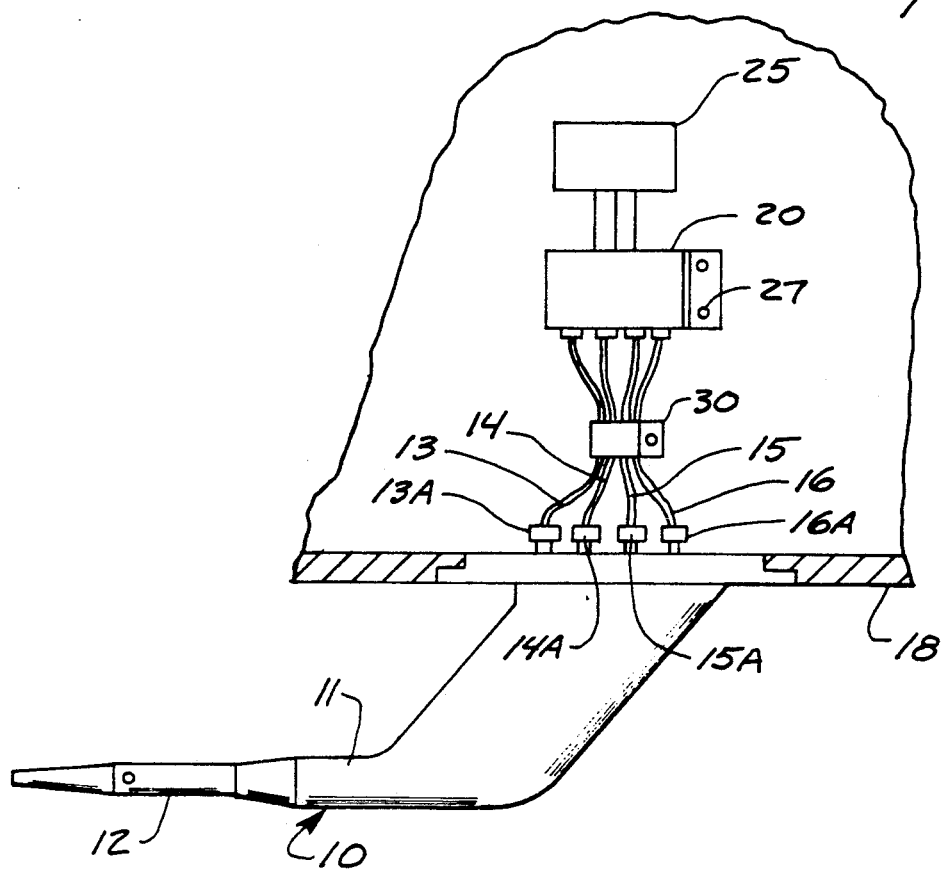
FIG. 1 is a schematic top plan view of a typical air data sensor or probe, schematically showing connections to an air data transducer on the interior of an aircraft.

The air data sensor assembly of the present invention is illustrated generally at 10, and includes an exterior probe 11 which has a probe barrel 12 that has suitable pressure sensing ports thereon for delivering pneumatic signals to flexible pneumatic lines or tubing. Such tubes are shown at 13, 14, 15 and 16. The flexible tubes 13, 14, 15 and 16 are connected to fittings 13A, 14A, 15A and 16A, on the probe, and are connected to suitable fittings on an air data transducer 20 at their opposite ends. The air data transducer 20 is of a conventional design and comprises absolute and differential pressure transducers which will provide electrical signals to suitable controls indicated generally at 25 that are used for flying the air vehicle. The probe 11 is mounted onto the skin of an air vehicle 18. The air data transducer can be mounted with a bracket 27 to the interior structure of the air vehicle 18. The bracket 27 can also be a rack with quick disconnects for easy removal from the aircraft Each of the flexible tubes or lines 13-16 can be provided with an optional branch or "Y" for forming a drain trap. The branch for line 13 is shown at 13B (each of the lines would have such a section) having a line section 13C which in turn then would lead to a water trap chamber 13D. Each of the chambers would have a suitable drain valve 26 thereon for permitting draining any moisture that accumulates. The drain trap can have a clear window for viewing to see if there is moisture. The drain can be accessible from an access port on the air vehicle skin.

The lines or tubes 13-16 are permanently attached at the factory or maintenance depot to the fittings 13A-16A on the probe, and to the fittings on the air data transducer. The assembly is pressure tested, and once assembled and found to be pressure tight, it is then ready for installation without disconnecting the lines 13-16. Because the lines are not disconnected, there are no leaks at fittings after installation. The flexible connections permit the air data transducer to be manipulated relative to the air data sensor or probe for fitting into tight places and for taking care of minor misalignments that are present.

Figure 3:
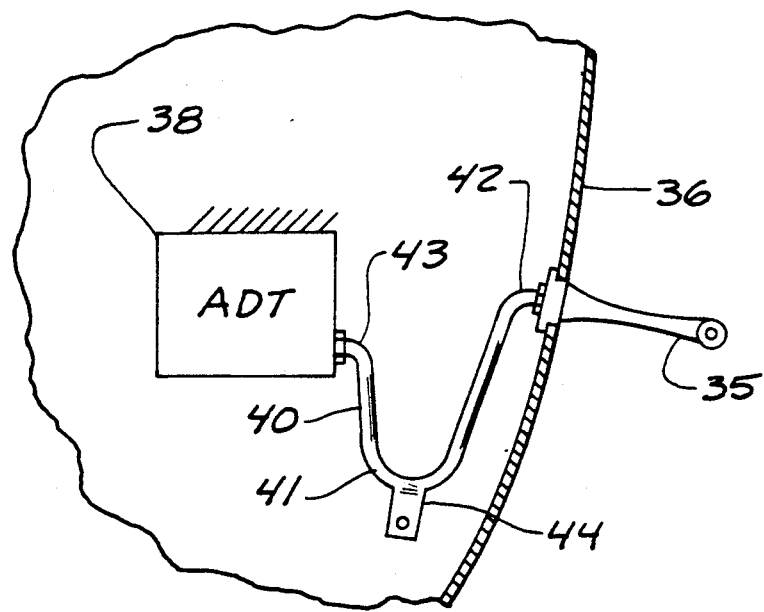
FIG. 3 is a schematic representation of a modified form of invention.

In FIG. 3, a modified form of the invention is shown schematically. A probe 35 is mounted on the skin 36 of an air vehicle. An air data transducer 38 is mounted on the interior of the air vehicle. A flexible line or tube 40 is permanently connected between fittings on the probe and on the transducer at the factory to make a sealed system that does not have to be pressure checked. The flexible tube has a U-shaped portion 41 that is positioned below the attachment sections 42 and 43. The lower end of the "U" shaped section includes a water trap and drain valve 44 for draining water.

The form of FIG. 3 thus has an integral section with a water trap for collecting and draining water.

With rigid metal tubing, this was not possible and while some units would have an air data transducer connected directly to a probe, that increased the weight on the aircraft skin, and also made it necessary for making connections at final installation on the aircraft. This in turn made it necessary for having pressure checks run which are time consuming, and extremely expensive when the down time of the aircraft is considered.

The valves in the drain traps can be the ones that are used for conventional drain traps so that it is insured that they can be tightly closed to prevent any leaks, but yet will permit draining water as necessary.

The hoses can be attached with clamps or can be adhesively applied to fittings on the probe and transducer.

The flexible lines can be bundled, and can be of relatively small diameter, but are of sufficient strength to withstand abrasions or excess vibration after installation in the aircraft. The tubes should be flexible enough to be manually bendable for aiding in installation.

Figure 2:
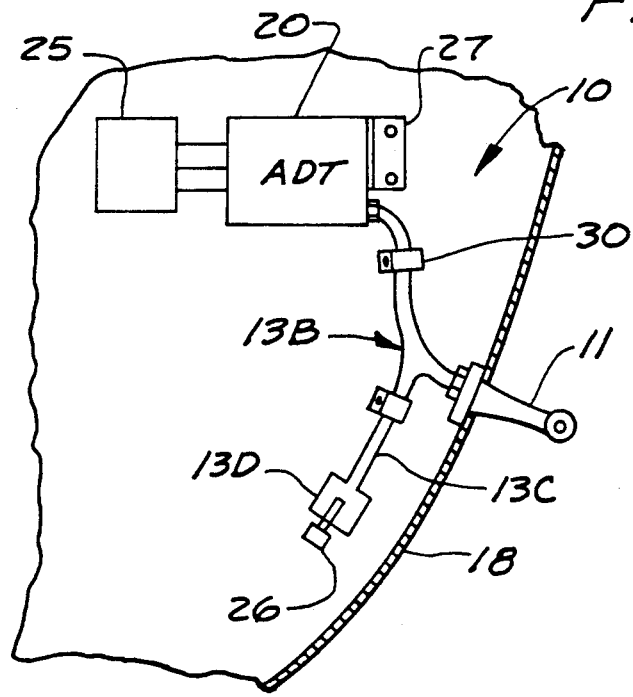
FIG. 2 is a schematic front view thereof illustrating the inclusion of a drain trap in such assembly.

The flexing between the air data transducer and the air data sensor or probe permits the installation to be either from the inside out or from the outside in, and manipulation can take place in either order of assembly. The bundle of hoses can be supported on the air frame, for example, with quick disconnect support clamps such as those shown at 30 in FIG. 2.

If special drain traps are needed for inverted flight, they can be used as is known in U.S. Pat. No. 4,645,517.

Because the air data sensing probe is separated from the air data transducer, the heaters on the air data probe do not have to be regulated or controlled to avoid transmission of excessive temperatures to the transducers. The flexible hoses are not good heat conductors, thus simplifying some of the controls.

Although the present invention has been described with reference to preferred embodiments, workers skilled in the art will recognize that changes may be made in form and detail without departing from the spirit and scope of the invention.

What is claimed is:

1. An air data sensor assembly comprising a sensor probe for mounting externally through a wall panel of an air vehicle and for providing at least one pneumatic signal through a fitting on the probe, an air data transducer having a fitting for receiving said pneumatic signal and being mountable interiorly of an air vehicle, and a flexible permanently mounted connector line connected in fluid tight relation to and extending between the fitting on the sensor probe and the fitting on the transducer such that the transducer and the probe are spaced when formed in an assembly, which flexible connector line permits movement of the transducer relative to the sensor probe for installation purposes with the sensor probe to be fixed externally of the wall panel for sensing air data, and the transducer to be fixed on an interior member of the air vehicle so portions of the assembly pass through the wall panel during installation without disconnecting the connector line from either one of the transducer and sensor probe, such that the fluid tight relation of the assembly remains intact.

2. The assembly as specified in claim 1 wherein said flexible line includes a section having an integral drain trap positioned to be below both the transducer and probe in use.

3. The assembly of claim 1 wherein said probe and said air data transducer have a plurality of fittings for carrying pneumatic signals, and wherein there are a plurality of flexible connector lines mounted between the fittings on the probe and the fittings on the transducer, said flexible lines being permanently connected to the probe fittings and to the transducer fittings, respectively, when the assembly is made, and before installation on an air vehicle.

4. A method of providing a fluid tight air data sensing probe and air data transducer assembly comprising the steps of manufacturing an assembly of an air data sensor and an air data transducer spaced from the air data sensor at a factory by sealingly connecting at least one flexible connector line between the air data sensor and transducer;

pressure checking the assembly at the factory to determine presence of any pressure leaks at connections of the flexible connector line to the air data sensor and air data transducer;

eliminating any pressure leaks determined to be present in the assembly at the factory location;

assembly the air data transducer and probe onto an air vehicle by passing portions of the assembly through a wall panel of such air vehicle without separating the factory connections of the flexible line from the probe or transducer; and mounting the air data sensor to such wall panel with the transducer spaced from the air data sensor and mounted to portions of the air vehicle other than the wall panel, without disconnecting the factory corrections of the flexible connector lien of the assembly.

5. The method of claim 4 wherein the step of connecting flexible lines comprises utilizing flexible reinforced substantially on thermally conductive hoses.

* * * * *

UNITED STATES PATENT AND TRADEMARK OFFICE
CERTIFICATE OF CORRECTION

PATENT NO. : 5,130,707
DATED : July 14, 1992
INVENTOR(S) : FLOYD W. HAGEN

It is certified that error appears in the above-identified patent and that said Letters Patent is hereby corrected as shown below:

Col. 4, line 64, delete "lien", insert "line"

Col. 4, line 68, delete "on thermally", insert "non-thermally"

Signed and Sealed this

Thirty-first Day of August, 1993

Attest:

BRUCE LEHMAN

Attesting Officer

Commissioner of Patents and Trademarks